United States Patent
Lytle et al.

(10) Patent No.: US 8,190,902 B2
(45) Date of Patent: May 29, 2012

(54) TECHNIQUES FOR DIGITAL SIGNATURE FORMATION AND VERIFICATION

(75) Inventors: Andrew T. Lytle, Kirkland, WA (US); Bryan J. Reich, Issaquah, WA (US); Gitika Gupta, Bellevue, WA (US); Matthew C. Pohle, Bellevue, WA (US); Mariya Tikunova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 931 days.

(21) Appl. No.: 11/364,403

(22) Filed: Feb. 27, 2006

(65) Prior Publication Data
US 2007/0204165 A1 Aug. 30, 2007

(51) Int. Cl.
*G06F 21/00* (2006.01)

(52) U.S. Cl. ........ 713/176; 713/164; 713/165; 713/179; 713/187

(58) Field of Classification Search .................. 713/176, 713/175, 180, 181, 187, 162, 164, 165, 167, 713/179; 707/203; 726/22, 5, 6, 7, 18, 19, 726/26

See application file for complete search history.

(56) References Cited

U.S. PATENT DOCUMENTS

| | | | |
|---|---|---|---|
| 5,047,930 A | 9/1991 | Martens et al. | |
| 5,455,941 A | 10/1995 | Okuno et al. | |
| 5,623,600 A | 4/1997 | Ji et al. | |
| 5,689,565 A * | 11/1997 | Spies et al. | 713/189 |
| 5,748,960 A | 5/1998 | Fischer | |
| 5,951,698 A | 9/1999 | Chen et al. | |
| 5,956,481 A | 9/1999 | Walsh et al. | |
| 6,006,034 A | 12/1999 | Heath et al. | |
| 6,367,012 B1 * | 4/2002 | Atkinson et al. | 713/176 |
| 6,434,103 B1 | 8/2002 | Shitara et al. | |
| 6,557,054 B2 | 4/2003 | Reisman | |
| 6,577,920 B1 * | 6/2003 | Hypponen et al. | 700/200 |
| 6,748,538 B1 * | 6/2004 | Chan et al. | 726/26 |
| 6,789,156 B1 | 9/2004 | Waldspurger | |
| 6,796,489 B2 * | 9/2004 | Slater et al. | 235/379 |
| 6,799,206 B1 | 9/2004 | Workman et al. | |
| 6,848,048 B1 * | 1/2005 | Holmes | 713/162 |
| 6,873,988 B2 | 3/2005 | Herrmann et al. | |
| 6,959,382 B1 | 10/2005 | Kinnis et al. | |
| 7,028,184 B2 | 4/2006 | Hind et al. | |
| 7,055,175 B1 * | 5/2006 | Le Pennec et al. | 726/24 |
| 7,093,135 B1 * | 8/2006 | Radatti et al. | 713/188 |
| 7,188,186 B1 * | 3/2007 | Meyer et al. | 709/231 |
| 7,191,407 B1 | 3/2007 | Kluttz et al. | |

(Continued)

FOREIGN PATENT DOCUMENTS

EP 1408393 4/2004

OTHER PUBLICATIONS

Schneier, Bruce, John Wiley & Sons: Applied Cryptography: "Protocols, Algorithms and Source Code in C", 1996, p. 30.

*Primary Examiner* — Eleni Shiferaw
*Assistant Examiner* — Hilary Branske

(57) ABSTRACT

Techniques are provided for forming a digital signature for a portion of a document. A registered module is invoked to process the document in accordance with a structured format associated with the document. The registered module is able to process a plurality of different structured formats. The registered module obtains the portion. A digital signature is formed for the portion. The digital signature is included in the document in accordance with the structured format.

20 Claims, 12 Drawing Sheets

U.S. PATENT DOCUMENTS

| | | |
|---|---|---|
| 7,203,959 B2 | 4/2007 | Nachenberg et al. |
| 7,210,041 B1 * | 4/2007 | Gryaznov et al. ............ 713/188 |
| 7,216,232 B1 * | 5/2007 | Cox et al. ...................... 713/176 |
| 7,269,733 B1 | 9/2007 | O'Toole, Jr. |
| 7,290,252 B2 | 10/2007 | Diedrich et al. |
| 7,308,567 B2 | 12/2007 | Yamamoto et al. |
| 7,434,058 B2 * | 10/2008 | Ahuja et al. ................... 713/177 |
| 7,453,472 B2 | 11/2008 | Goede et al. |
| 7,814,328 B1 * | 10/2010 | Leonard et al. ............... 713/179 |
| 8,060,747 B1 * | 11/2011 | Leonard et al. ............... 713/176 |
| 2001/0010720 A1 | 8/2001 | Kimball et al. |
| 2001/0034839 A1 | 10/2001 | Karjoth et al. |
| 2002/0002703 A1 | 1/2002 | Baentsch et al. |
| 2002/0004902 A1 | 1/2002 | Toh et al. |
| 2002/0007453 A1 | 1/2002 | Nemovicher |
| 2002/0013910 A1 * | 1/2002 | Edery et al. ................... 713/201 |
| 2002/0023221 A1 | 2/2002 | Miyazaki et al. |
| 2002/0087564 A1 | 7/2002 | Khanna et al. |
| 2002/0087596 A1 | 7/2002 | Lewontin |
| 2002/0099671 A1 | 7/2002 | Crosbie et al. |
| 2002/0112083 A1 | 8/2002 | Joshi et al. |
| 2002/0112161 A1 | 8/2002 | Thomas et al. |
| 2002/0129257 A1 * | 9/2002 | Parmelee et al. ............. 713/180 |
| 2002/0129277 A1 | 9/2002 | Caccavale |
| 2002/0170052 A1 | 11/2002 | Radatti |
| 2003/0009533 A1 | 1/2003 | Shuster |
| 2003/0056102 A1 * | 3/2003 | Aho et al. ...................... 713/176 |
| 2003/0088790 A1 | 5/2003 | Kaler et al. |
| 2003/0145213 A1 * | 7/2003 | Carbone ......................... 713/188 |
| 2003/0149581 A1 | 8/2003 | Chaudhri et al. |
| 2003/0212893 A1 * | 11/2003 | Hind et al. ..................... 713/177 |
| 2003/0221105 A1 * | 11/2003 | Bajaj ............................. 713/176 |
| 2004/0039912 A1 | 2/2004 | Borrowman et al. |
| 2004/0148508 A1 * | 7/2004 | Alev et al. ..................... 713/180 |
| 2004/0193543 A1 | 9/2004 | Nord et al. |
| 2004/0230891 A1 * | 11/2004 | Pravetz et al. ................ 715/511 |
| 2005/0005101 A1 * | 1/2005 | Yenduri ......................... 713/164 |
| 2005/0039018 A1 | 2/2005 | Wittkotter |
| 2005/0050044 A1 | 3/2005 | Takagi et al. |
| 2005/0055686 A1 | 3/2005 | Buban et al. |
| 2005/0063545 A1 | 3/2005 | Fujimoto et al. |
| 2005/0086469 A1 | 4/2005 | Dunagan |
| 2005/0131917 A1 | 6/2005 | Auerbach |
| 2005/0172339 A1 | 8/2005 | Costea et al. |
| 2006/0015940 A1 | 1/2006 | Zamir et al. |
| 2006/0079333 A1 | 4/2006 | Morrow et al. |
| 2006/0095971 A1 * | 5/2006 | Costea et al. .................... 726/26 |
| 2006/0143600 A1 | 6/2006 | Cottrell et al. |
| 2006/0167902 A1 | 7/2006 | Bhattacharyay et al. |
| 2006/0206718 A1 | 9/2006 | Frank et al. |
| 2006/0271597 A1 | 11/2006 | Boske |
| 2007/0094710 A1 | 4/2007 | Walker et al. |
| 2007/0208943 A1 * | 9/2007 | Gupta et al. ................... 713/176 |
| 2008/0120710 A1 | 5/2008 | Holz et al. |
| 2008/0128492 A1 | 6/2008 | Roth et al. |
| 2009/0057421 A1 | 3/2009 | Suorsa et al. |

* cited by examiner

TECHNIQUES FOR DIGITAL SIGNATURE FORMATION AND VERIFICATION

BACKGROUND

Applications, such as word processing or spreadsheet programs, operate on documents. Such software applications may allow users to perform data operations using customized code such as, for example, macros. The code may be embedded so that the application stores the code within the document. The code embedded in the document may be executed in connection with performing operations on the document when accessed by the application. Use of such code by the application presents a security risk including an opportunity for malicious code or a code modification to be introduced into the code portion of the document. Malicious code may be unknowingly executed by the application when accessing the document.

One approach used to ensure that there have been no modifications to the embedded code, such as through the introduction of malicious code into the document, is attaching a digital signature to the code portion. Existing applications which allow users to develop such code portions may also allow the users to digitally sign their code. While the document is opened and accessed by the application, the user may manually select one or more menu options in connection with forming the digital signature.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are techniques for forming a digital signature for code portions of a document. In accordance with one aspect of the techniques described herein, a registered module is invoked to process the document in accordance with a structured format associated with the document. The registered module is able to process a plurality of different structured formats. The registered module obtains the code portion. A digital signature is formed for the code portion. The digital signature is included in the document in accordance with the structured format.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
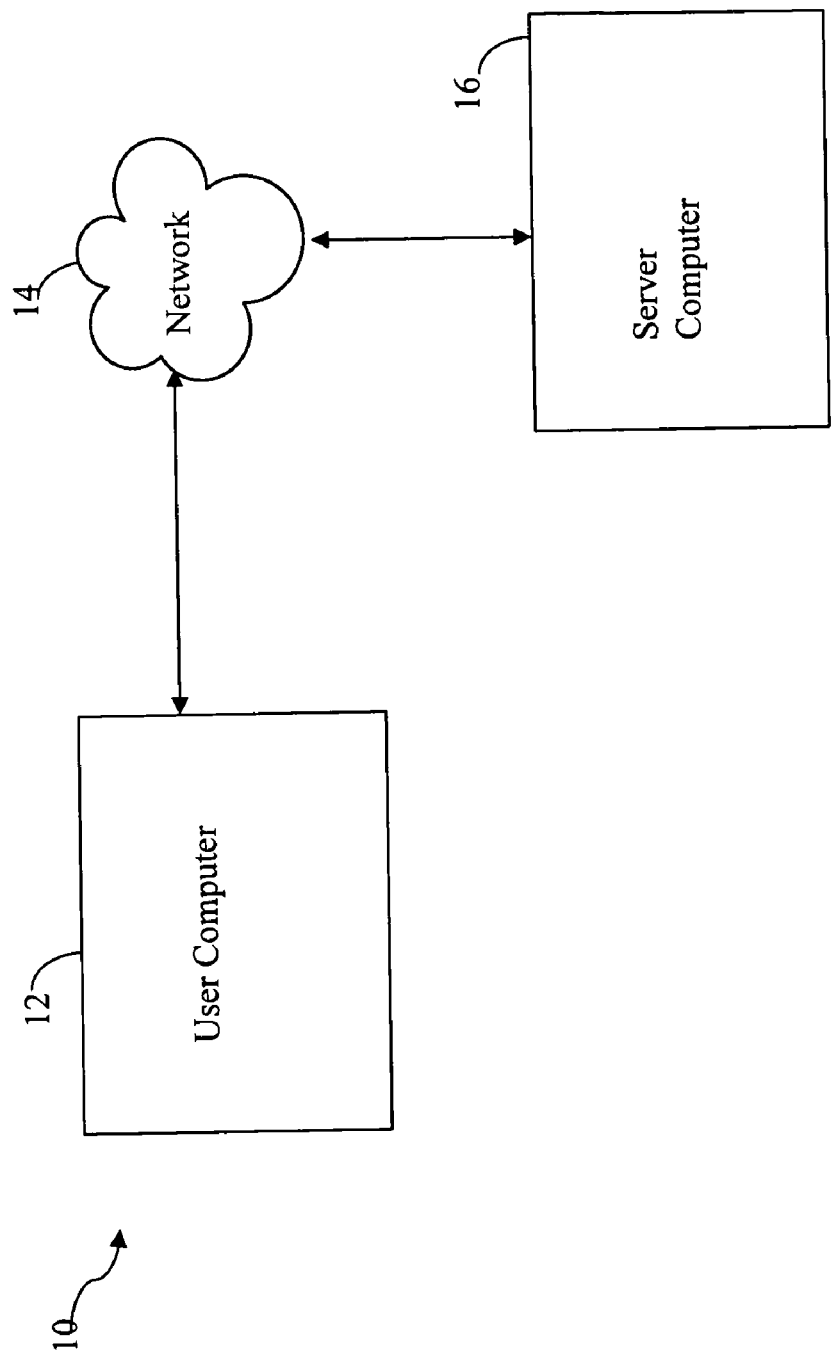
FIG. 1 is an example of an embodiment illustrating an environment that may be utilized in connection with the techniques described herein.

Referring now to FIG. 1, illustrated is an example of a suitable computing environment 10 in which embodiments utilizing the techniques described herein may be implemented. The computing environment 10 illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a user computer 12, a network 14, and a server computer 16. The user computer 12 may include a standard, commercially-available computer or a special-purpose computer that may be used to execute one or more program modules. Described in more detail elsewhere herein are program modules that may be executed by the user computer 12 in connection with digital signature and verification techniques providing a signature for embedded code within an application document in an automated fashion for a variety of different structured document formats. The user computer 12 may operate in a networked environment and communicate with a server computer 16 to perform requests made by the user computer 12.

It will be appreciated by those skilled in the art that although the user computer is shown in the example as communicating in a networked environment, the user computer 12 may communicate with other components utilizing different communication mediums. For example, the user computer 12 may communicate with one or more components utilizing a network connection, such as the Internet or intranet, and/or other type of link known in the art including, but not limited to, the dial-up connection, satellite connection, or other wireless and/or hardwired connection(s).

Figure 2:
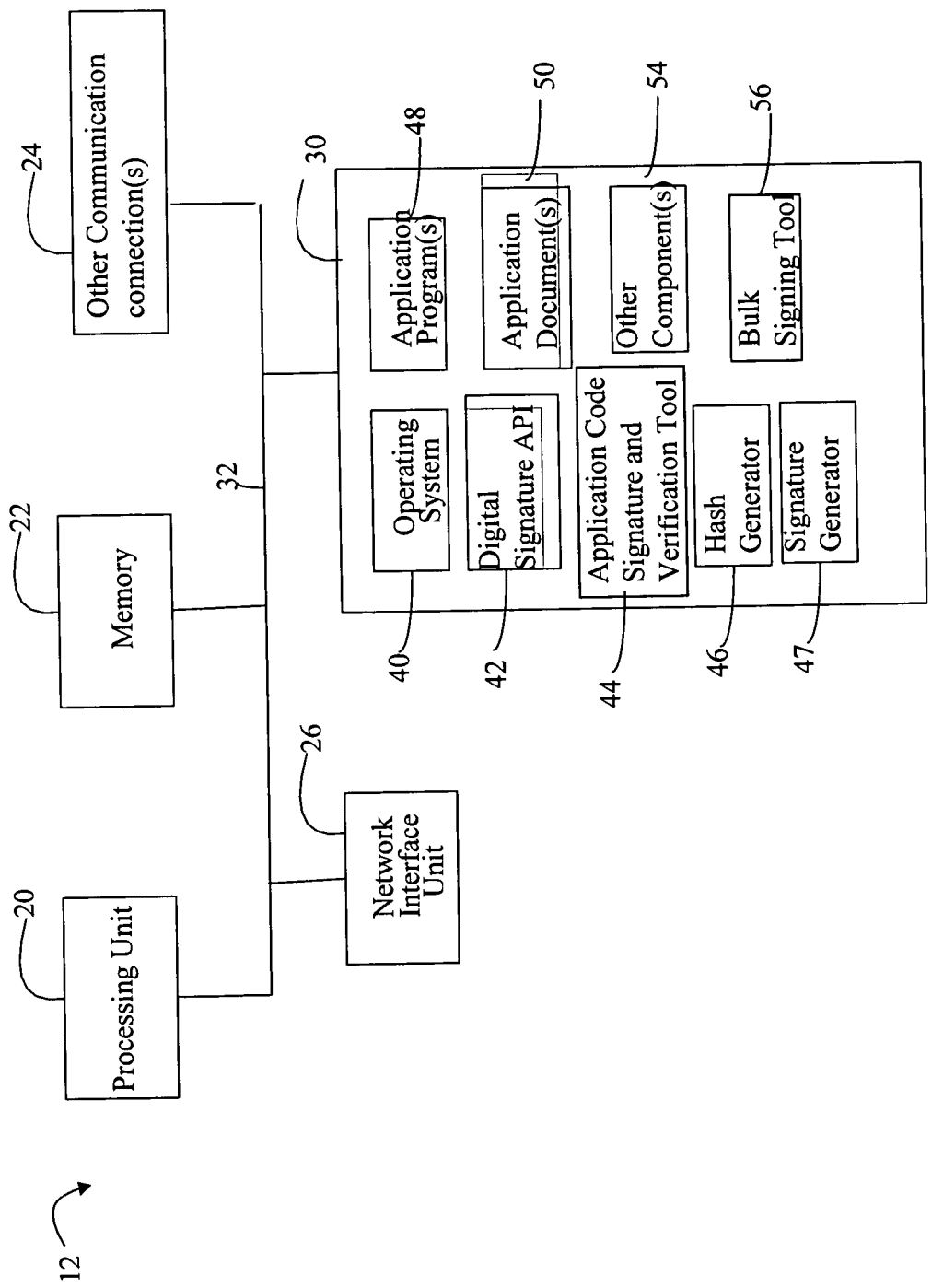
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, a digital signature API 42, an application code signature and verification tool 44, a hash generator 46, a signature generator 47, one or more application programs 48, one or more application documents 50, a bulk signing tool 56, and other components 54. The operating system 40 may be any one of a variety of commercially available or proprietary operating system. The operating system 40, for example, may be loaded into memory in connection with controlling operation of the user computer. One or more application programs 48 may execute in the user computer 12 in connection with performing user tasks and operations.

It should be noted that although the program modules and/or data files included in storage 30 are illustrated in this example as being included on user computer 12, an embodiment may also include some or all of these elements in the storage 30 of another computer, such as the server computer 16 which may perform the techniques described herein.

Application documents 50 may be used with particular application programs 48. In one example, an application program may be, for example, a word processing application such as Microsoft Word™ or other Microsoft Office™ application program. The application program may access an application document. The application document may be stored in an application specific file format that may vary with the particular application program. Included within the application document may be a code portion which can executed at any point in time when the document is open for processing by the application program. The code portion included in the document may be, for example, code included in a Visual Basic for Applications™ (VBA) project area. The code may be characterized as embedded within the application document for use in connection with performing processing operations on the document by the application program. Depending on the application, code may be generated by the application program as the result of, for example, macro processing operations. A user may also provide code which may be included in the VBA project area.

An embodiment may perform processing using the techniques described herein in connection with digitally signing the foregoing code portion that may be included in each application document. Techniques, such as formation of a digital signature for the code portion of an application document, may be used to ensure that the code included in the code portion has not been modified. Such modification may occur, for example, if malicious code is unknowingly included in the VBA project area of a document.

It should be noted that there are publicly available tools such as, for example, signcode.exe and signtool.exe, that may be used in connection with signing particular file types. Signtool.exe is a commercially available tool by Microsoft Corporation for digitally signing files, verifying signatures in files, and time stamping files. Signcode.exe is a .NET framework tool by Microsoft Corporation for signing a portable executable file. These tools may invoke other code, such as existing libraries, in connection with parsing particular file formats. Such existing libraries may not have the ability to parse Microsoft Office™ documents and other application documents having specific file formats which may be unknown to the tools and existing libraries. The techniques described in following paragraphs may be used in connection with locating the particular code portion such as, for example, the VBA project area of a document, forming a digital signature for the code portion, storing the digital signature in the document in accordance with the structure of a particular application's document file format, and then optionally verifying the digital signature. It should be noted that although the techniques described herein store the signature as part of the application document or in a particular location of the application document, the signature may be stored elsewhere. Additionally, although specific reference for illustration purposes herein refer to code portions, the techniques described herein may also be used in connection with one or more portions of a structured document format in which each portion may include source code, executable code, scripts including instructions in a human-readable form, and the like, which may be used in connection with the application program associated with the particular structured document format. The examples herein may also refer to Microsoft Office documents but, as will be appreciated by those skilled in the art, may also be used in connection with other documents for digitally signing code portions associated therewith.

One way in which an application program 48 may provide for digitally signing a code portion included within an application document includes a user executing the application program and having the application document accessed by the application program. For example, a user may be executing Microsoft Word™ and have an application document open for use within the word processing application. The user may then select one or more menu options from within the word processing application to form and store a digital signature within the application document currently being accessed by the application.

The techniques described herein provide for automated formation and/or verification of a digital signature for such code portions without utilizing the application program as described above. In other words, the digital signature may be formed and/or verified without requiring the particular application to be installed on the user computer or other computer, such as the server computer, which may be servicing a request for digital signature formation and/or verification.

The digital signature API (Application Programming Interface) 42 may include a select set of APIs used in connection with digital signature and encryption functionality. In one embodiment, the digital signature API may include an API which, in turn, results in making one or more underlying calls utilizing functionality included in the operating system 40. For example, a digital signature API may result in one or more Win 32 APIs being invoked in an embodiment utilizing a Microsoft Windows™ operating system.

The application code signature and verification tool 44 may be registered with the operating system 40 as the particular tool used to parse and process particular file formats such as, for example, Microsoft Office™ file formats. As will be described in more detail in following paragraphs, one embodiment of the tool 44 is capable of processing a variety of different application document formats associated with Microsoft Office™ applications. The tool searches for a single VBA project in each of the file formats and generates and/or verifies a single digital signature for all of the code included in a single VBA project for an application document. Each of the different application document formats may store the VBA project and/or signature at different locations in accordance with each of the different formats.

The hash generator 46 may be used in connection with generating a hash value for a particular code portion included in an application document. It should be noted that in connection with the techniques described herein, any one of a variety of different publicly available or proprietary hash generation techniques may be used in connection with the processing described herein. For example, in one embodiment, the hash generator 46 may form a hash for the VBA project area of a Microsoft Office™ document using the technique described in U.S. patent application Ser. No. 11/225,706, filed Sep. 12, 2005, entitled "DIGITAL SIGNATURES FOR EMBEDDED CODE" (pending), Attorney Docket No. 310269.01, which is incorporated by reference herein.

The signature generator 47 may be used in connection with generating a digital signature using a hash (e.g., such as produced by the hash generator 46), a private key, and a digital certificate. Any one of a variety of different techniques may be used in connection with generating a digital signature in accordance with a particular hash, private key, and digital certificate. In one embodiment, the SHA-1 technique may be used to generate a digital signature used in connection with the techniques described herein. For example, the SHA-1 technique may be used to generate the hash which is then encrypted using a digital certificate and private key resulting in the digital signature.

The bulk signing tool 56 may be used in connection with forming a digital signature and/or performing verification of the digital signature for one or more application documents in one or more different document formats for various application programs. In other words, the bulk signing tool 56 may be used in connection with forming digital signatures for multiple documents in which each of the documents is in a different structured format. In one embodiment, that will be described in more detail in the following paragraphs, the bulk signing tool 56, may invoke the application code signature and verification tool 44 in connection with digital signature formation and verification for an application document. One embodiment of the bulk signing tool 56 is described in more detail in pending U.S. patent application Ser. No. 11/363,585, filed on even-date herewith, entitled "CODE SIGNING TOOL FOR MICROSOFT OFFICE", which is incorporated by reference herein.

Figure 3:
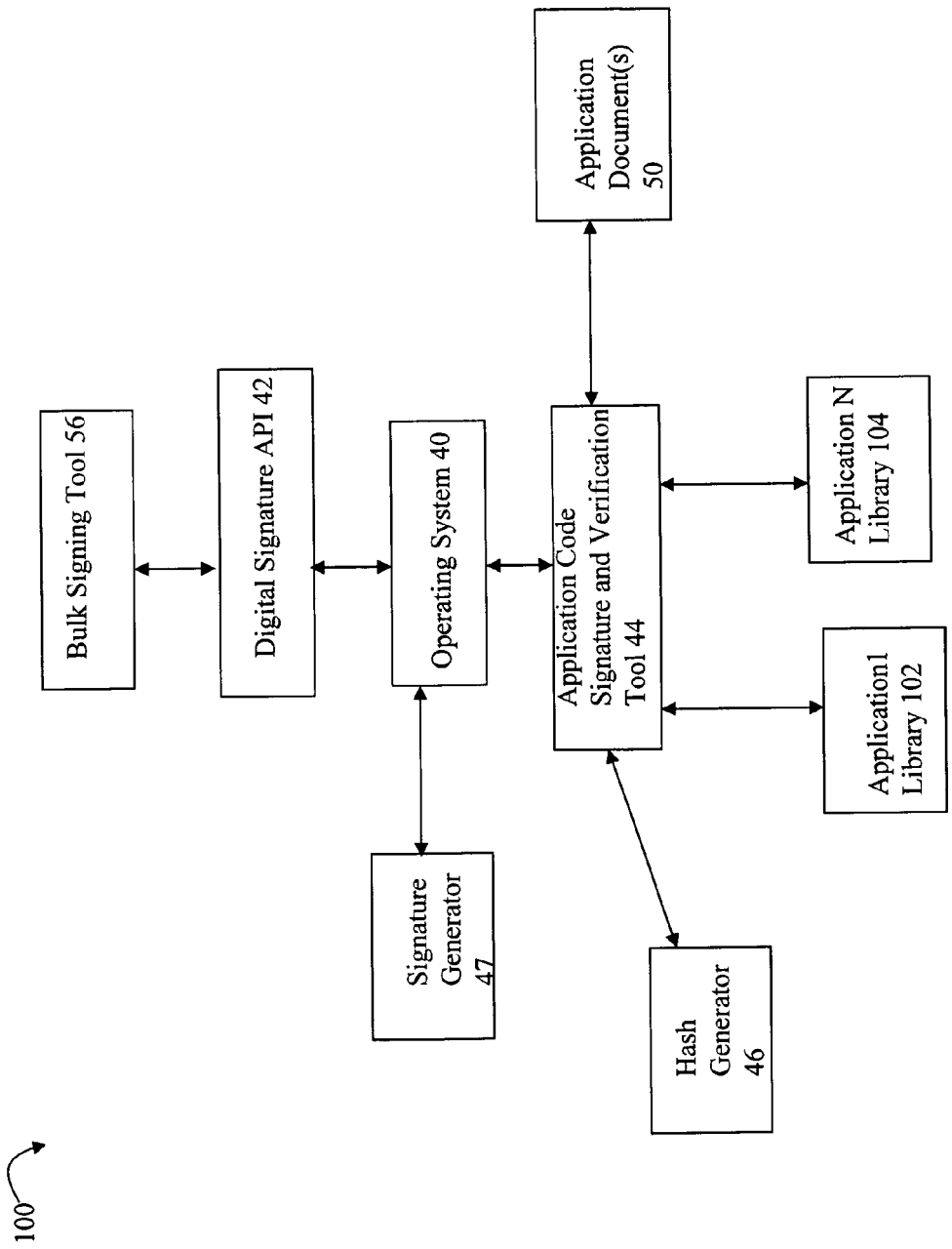
FIG. 3 is a block diagram illustrating how components in one embodiment communicate with each other in connection with performing the techniques described herein.

Referring now to FIG. 3, shown is a block diagram illustrating how components in one embodiment communicate with each other in connection with performing the techniques described herein. In particular, the example 100 illustrates how components previously described in connection with FIG. 2 may interact in connection with performing the techniques described herein for signature generation and verification. In one embodiment, the bulk signing tool 56 may utilize one or more APIs included in the digital signature API 42 to form and/or verify a digital signature in connection with one or more application documents. It should be noted that although only the tool 44 is shown as accessing the application document 50, one or more other components of the example 100 may also access application documents. However, such detail has been omitted for sake of simplicity of illustrating the techniques described herein.

In one embodiment, invocation of a digital signature API 42 may result in invocation of one or more operating system calls such as one or more calls using the Win32 API, to routines included in the operating system 40. The digital signature API 42 may be characterized as a software layer including one or more APIs in which each of the APIs incorporates one or more processing steps to perform a particular operation in connection with digital signature processing. Use of a software layer, such as the digital signature API 42, facilitates performing a particular task for a calling program, such as the bulk signing tool 56, since the tool 56 may make a single API call resulting in performance of one or more underlying operating system calls. It should be noted that an embodiment may also include some or all of the functionality of the digital signature API 42 described herein in hardware as well as software.

Subsequently, the operating system 40 queries one or more registered modules, each having a predefined interface, to determine which of the registered modules can process a particular file type associated with an application document. In one embodiment, the application code signature and verification tool 44 is registered as capable of processing Microsoft Office™ documents. For example, in one embodiment, each of the Microsoft Office™ applications utilizes one or more file types as set forth below:

| Application | File types |
|---|---|
| Microsoft Excel ™ | .xls, .xlt, .xla, .xlsm, .xltm, .xlsb, .xlam |
| Microsoft PowerPoint ™ | .ppt, .pot, .pps, .ppa, .pptm, .potm, .ppam, .sldm, .ppsm |
| Microsoft Project ™ | .mpp, .mpt |
| Microsoft Publisher ™ | .pub |
| Microsoft Visio ™ | .vsd, .vss, .vst, .vdx, vtx, .vsx |
| Microsoft Word ™ | .doc, .dot, .wiz, .docm, .dotm |

In an embodiment, each file type may correspond to a different document format or variation of a document format associated with an application.

When the bulk signing tool 56 is processing the Microsoft Office™ document, the operating system 40 interacts with the tool 44 for formation and verification of the digital signature associated with the document. The tool 44 makes calls to application-specific or file-format specific libraries, such as libraries 102 and 104, in connection with parsing and performing processing for the different file formats. In other words, the tool 44 invokes a specific application library for processing application documents in a particular format as may be used by an application program. An embodiment may also include and use libraries as described herein based on file types or file formats rather than application association. For example, the tool 44 may utilize application library 102 when processing Microsoft Word™ application documents. The tool 44, may also utilize application library 104 when processing, Microsoft PowerPoint™ application documents. Similarly, there may be a distinct and separate application library for processing application documents utilized by each different application program included in Microsoft Office™. The foregoing use of application-specific libraries provides for modularized coding techniques. It should be noted that in one embodiment, the tool 44 may be implemented as a DLL and the application specific libraries 102, 104 may be included as static libraries therewith. The application specific libraries may include a predefined interface utilized by the tool 44 in connection with parsing the document in accordance with a particular structured format to perform operations on certain portions of the document as well as store information into the document in accordance with the structured format. As described herein, the tool 44 may invoke an application specific library to locate a code portion of a document and for storing a digital signature to the document in accordance with the document's defined structure.

The tool 44 may also interact with the hash generator 46 when determining the hash for a particular code portion, such as a VBA project, included in a document. The tool 44 may communicate the hash value for a particular code portion to the operating system 40 which may, in turn, use the generated hash value, private key and a digital certificate for generating a digital signature by invoking the signature generator 47. Once the digital signature has been formed, the operating system may interact with the tool 44 to store the digital signature in the document. The tool 44 may then utilize the particular application library to store the digital signature in the appropriate location in the particular file format.

Figure 4:
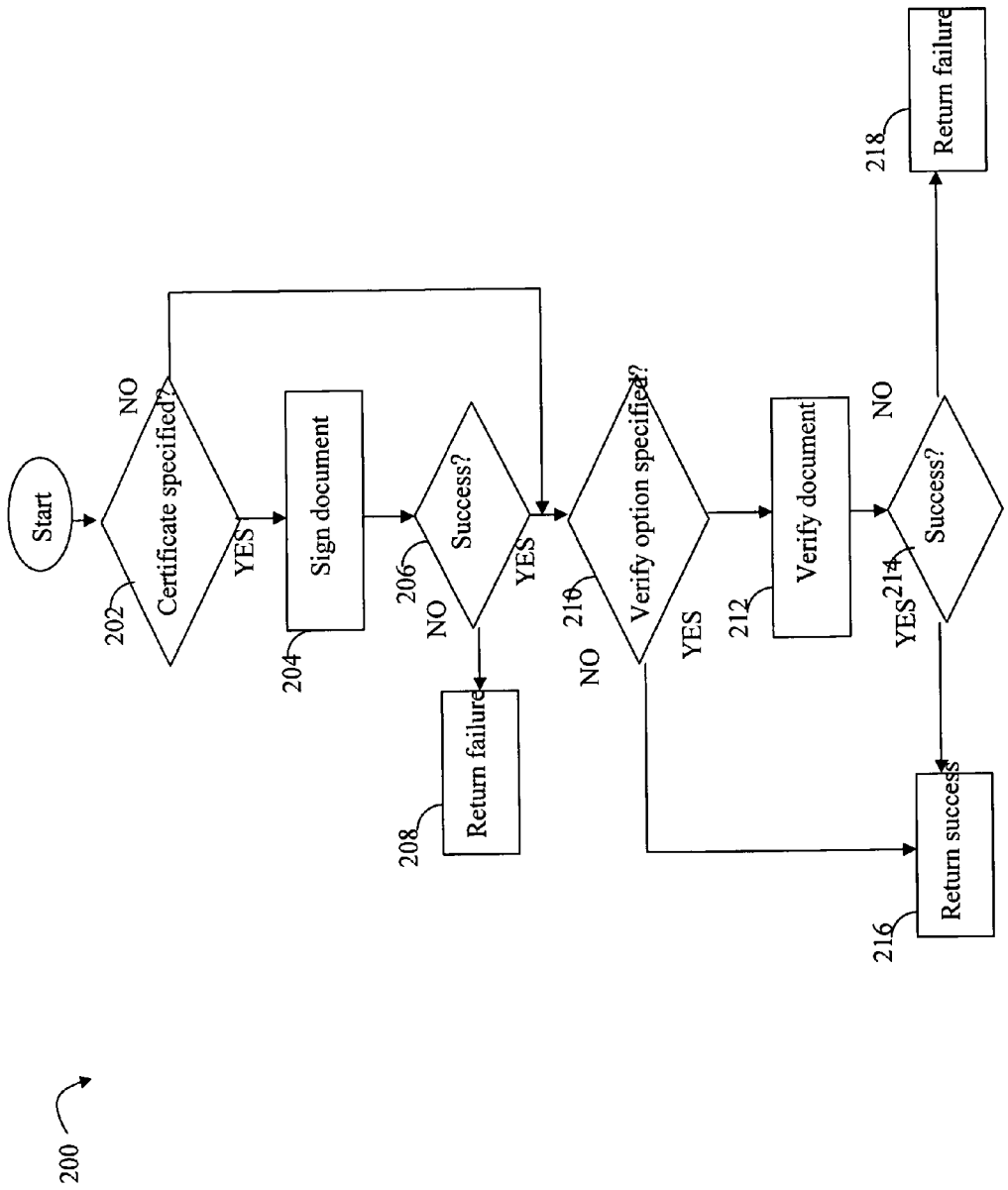
FIG. 4 is a flowchart of processing steps that may be performed by the bulk signing tool in one embodiment in connection with the techniques described herein.

Referring now to FIG. 4, shown is a flowchart of processing steps that may be performed by the bulk signing tool for digitally signing and/or verifying a digital signature for an application document. The bulk signing tool may perform the processing of flowchart 200 for multiple documents such as, for example, multiple Microsoft Office documents of varying structured formats.

At step 202, a determination is made as to whether a digital certificate has been provided. If not, control proceeds to step 210. Otherwise, if step 202 evaluates to yes, control proceeds to step 204 to sign the application document. As described in more detail elsewhere herein, the processing of step 204 may be performed by the bulk signing tool invoking the application code signature and verification tool 44. Subsequently, control returns from the tool 44 where a determination is made at step 206 as to whether the document was successfully signed. If step 206 evaluates to no, control proceeds to step 208 where failure status is returned. If step 206 evaluates to yes, control proceeds to step 210, where a determination is made as to whether the verify option has been specified. If the verify option has not been specified, control proceeds to step 216 to return a successful status. If step 210 evaluates to yes, control proceeds to step 212 where verification of the digital signature formed at step 204 is performed. In one embodiment as described herein, the processing of step 212 may be performed by invoking the application code signature and verification tool 44. Once the tool 44 performs verification processing of the digital signature, control returns to step 214 where a determination is made as to whether the verification was a success. If so, control proceeds to step 216. Otherwise, if step 214 evaluates to no, control proceeds to step 218 where failure status is returned.

Figure 5:
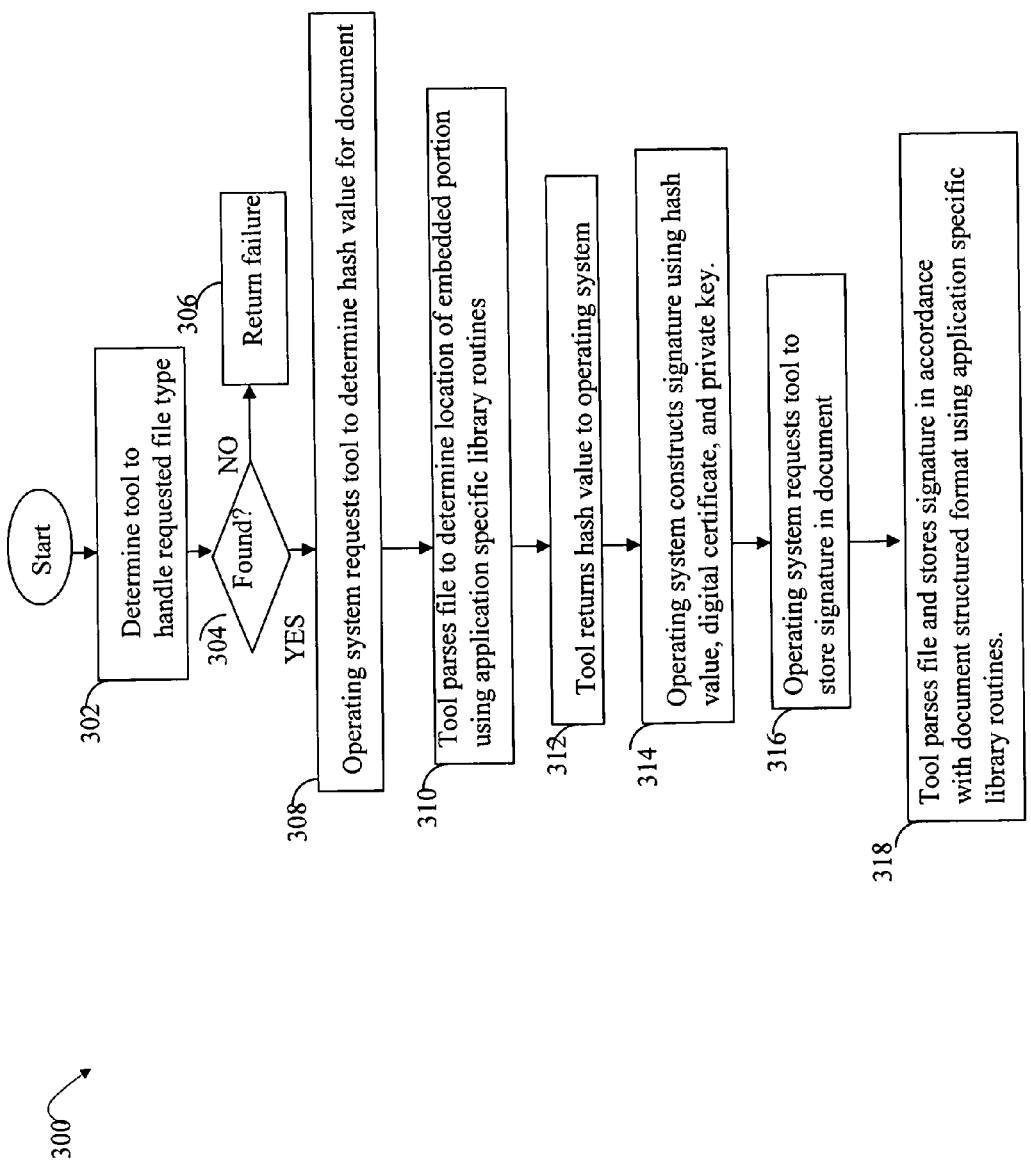
FIG. 5 is a flowchart of processing steps that may be performed by the operating system and application code signature and verification tool in one embodiment in connection with the techniques described herein for forming a digital signature.

Referring now to FIG. 5, shown is a flowchart of processing steps that may be performed in an embodiment by the operating system 40 and the application code signature and verification tool 44 when signing a document. The flowchart 300 may be characterized as outlining the dialogue between components 40 and 44 in one particular embodiment. The processing of flowchart 300 summarizes processing steps previously described in connection with FIG. 3 and step 204 of FIG. 4. At step 302, the operating system 40 determines the particular tool or module which is registered to handle the particular file type. For example, if the tool 56 has requested storing a digital signature in a Microsoft PowerPoint™ document, the operating system 40 determines which of the registered modules is designated as processing Microsoft PowerPoint™ documents, and accordingly invokes that particular module, which in this example is the application code signature and verification tool 44. At step 304, the operating system makes a determination as to whether a registered module has been found to handle the designated file type of the application document. If not, control proceeds to step 306 where a failure status is returned. Otherwise, control proceeds to step 308, where the operating system issues a request to the selected registered module, which is the tool 44 in this example, to determine the hash value for the document. Control proceeds to step 310 where the tool parses the particular application document to determine the location of the embedded portion of code using the application-specific library routines for the particular format of the document being processed. At step 312, the tool returns the hash value to the operating system. As part of processing at step 312, the tool 44 may utilize the hash generator 47. At step 314, the operating system constructs a digital signature using the hash value, digital certificate and private key. As part of processing at step 314, the operating system may utilize the signature generator 47. At step 316, the operating system requests the tool 44 to store the signature in the document in accordance with the particular structure format of that document. At step 318, the tool parses the document and stores the signature in accordance with the document's structured format using the appropriate application-specific library.

In one embodiment, a single application library, such as 102, may be utilized in connection with processing all the file types of a particular application program associated with the library 102.

Figure 6:
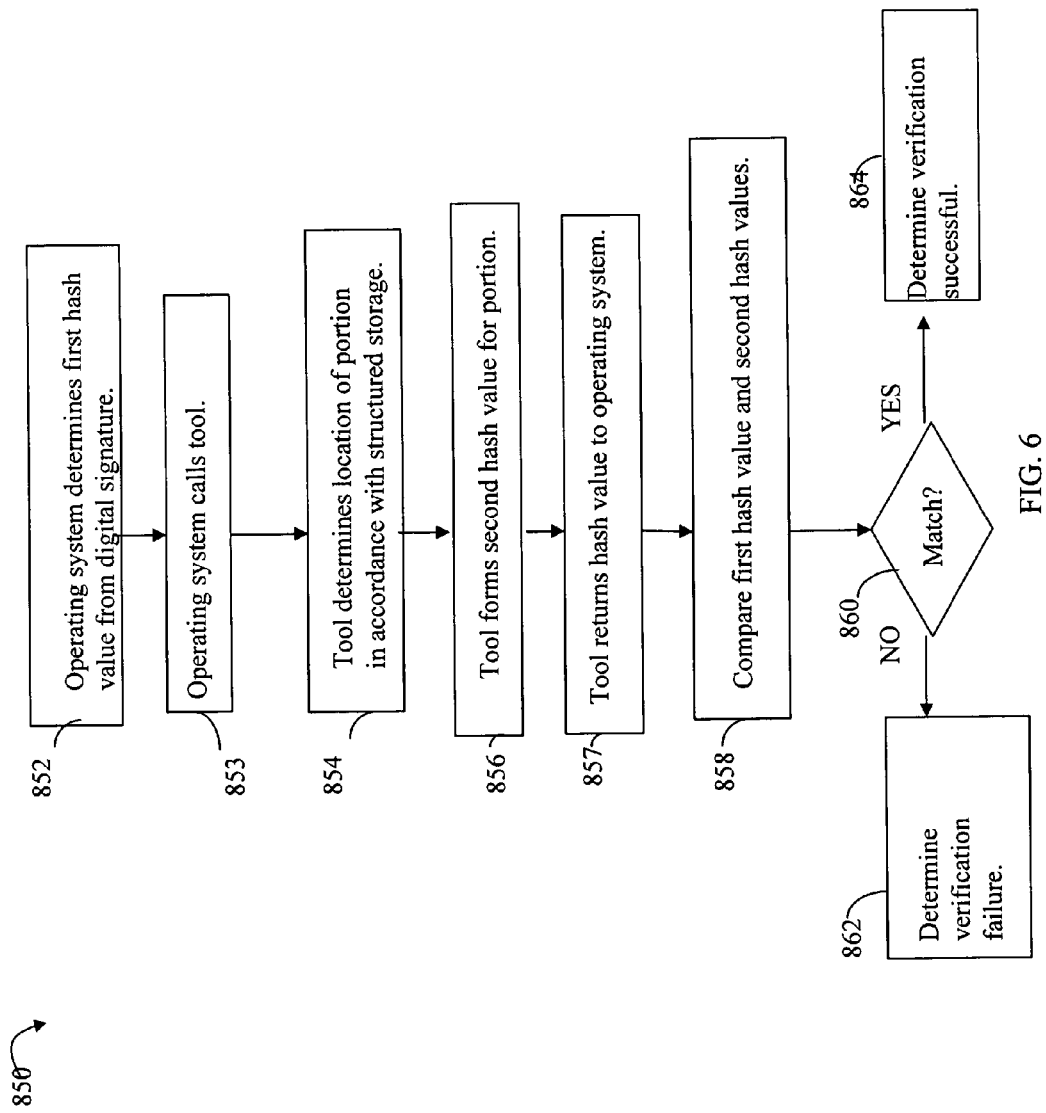
FIG. 6 is a flowchart of processing steps that may be performed by the operating system and application code signature and verification tool in one embodiment in connection with the techniques described herein for verification of a digital signature.

Referring now to FIG. 6, shown is a flowchart of processing steps that may be performed in an embodiment in connection with verification of a digital signature. The steps of flowchart 850 set forth more detailed processing of one embodiment of step 212 from FIG. 4. The processing of flowchart 850 regenerates the hash value for a code portion and compares that regenerated hash value to the hash value retrieved in accordance with an existing digital signature. Verification processing may be performed to ensure that processing problems or errors have not occurred in the formation of the digital signature. At step 852, a first hash value is determined from the digital signature formed as part of step 204 processing. Step 852 may be performed by the operating system 40. In one embodiment, the digital signature is requested by the operating system from the tool 44. The tool 44 parses the document for the digital signature. The operating system extracts the hash value from this digital signature using the complementary operation performed by the signature generator 47. For example, the component 47 when signing may use a private key to encode the data to create the digital signature. To "undo" this operation as performed at this step, a complementary public key is used in decoding to retrieve the corresponding hash value. At step 853, the operating system calls the tool 44 to form the second hash value. At step 854, the tool parses the document and determines the location of the portion in accordance with the structured storage of the document. The tool 44 may perform this processing of step 854 by making calls to routines in the appropriate application specific library which determines the location of the code portion for the format of the document being processed. At step 856, the tool forms a second hash value for the code portion. Step 856 may be performed utilizing the hash generator 46 as described elsewhere herein. At step 857, the tool 44 returns the second hash value to the operating system. At step 858, the first hash value determined at step 852 is compared to the second hash value formed at step 856. Step 858 may be performed by the operating system calling the tool 44 to perform the comparison. At step 860, the tool 44 may make a determination as to whether the first and second hash values match. If so, control proceeds to step 864 where it is determined that verification processing was successful. Otherwise, control proceeds to step 862 where it is determined that verification processing has failed. The tool 44 may then return a status in accordance with whether step 860 resulted in a determination of success (step 864) or failure (step 862).

As described herein, the tool 44 may be used for digital signature generation and/or validation. As also described herein, the tool 44 may be used to validate a newly formed digital signature for an application document. It should also be noted that although the particular example illustrated herein includes the bulk signing tool 56, other tools, such as signtool.exe, may also invoke the APIs resulting in invocation of the tool 44 for digital signature formation and/or validation processing.

The techniques described herein may be applied in connection with any one of a variety of different file formats and structured storage arrangements. In one embodiment, the techniques described herein may be applied to a binary file format as used in connection with, for example, Microsoft Office PowerPoint 97™ and later versions. The binary file format for one embodiment of a Microsoft Office PowerPoint™ file may be characterized as a structured file referred to as a "docfile" or a "compound file" known to those of ordinary skill in the art as OLE DocObject files. A "docfile" may include a hierarchical system of storages and streams. Binary data from Microsoft PowerPoint™ is written into streams within the docfile using the Windows Structured Storage APIs. These streams are stored in the file as linked lists of file blocks. Information in the foregoing binary format may be accessed using the Windows Structured Storage APIs documented at http://msdn.microsoft.com/library/default.asp?url=/library/en-us/stg/stg/structured_storage_start_page.asp.

The binary file format in an embodiment using the foregoing may include the following streams:

Current User Stream—Stores information, such as the name, of the user who last opened the presentation.

PowerPoint Document Stream—Stores information about a Microsoft PowerPoint™ presentation. Additional detail about the layout and contents are described elsewhere herein.

Pictures Stream (Optional)—Stores data about the pictures (e.g., metafiles, PNG, JPG, etc) contained in a Microsoft PowerPoint™ presentation.

Summary Information Stream (Optional)—Stores statistics and summary information about the document.

It should be noted that in one embodiment as described herein, the Pictures Stream and the Summary Information Stream are optional. Additional detail will now be described regarding the Current User Stream and the PowerPoint Document Stream.

Figure 7:
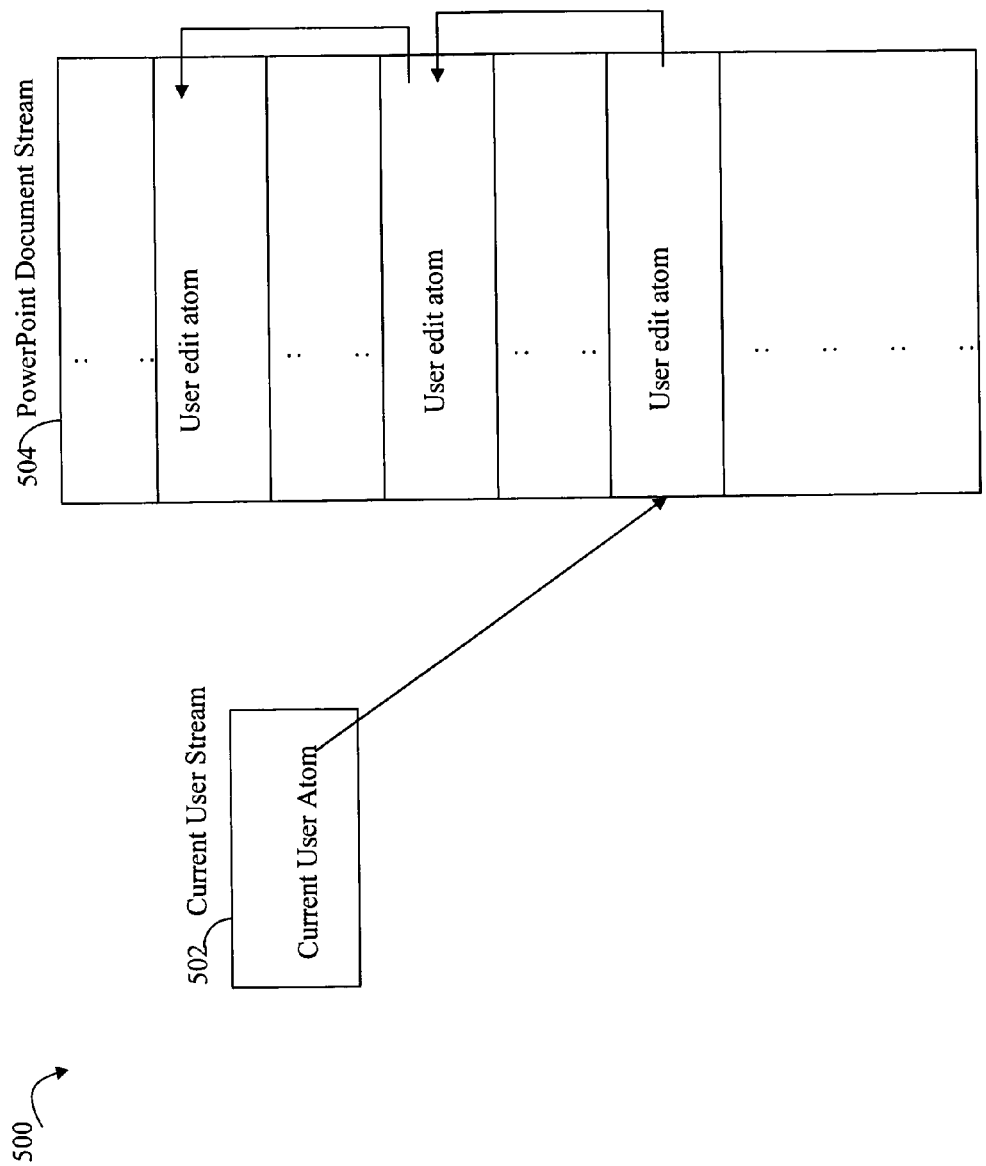
FIGS. 7-10 illustrate in more detail one particular document format which includes embedded code therein.

Referring now to FIG. 7, shown is an example graphically illustrating a current User Stream and the PowerPoint Document Stream. The example 500 shows the Current User Stream 502 as including a pointer to the latest saved edit in the PowerPoint Document Stream. The various edits made to the file are represented in this illustration by the User edit atoms. Atoms and other elements used in connection with the binary file format are described elsewhere herein in more detail. The example 500 shows the PowerPoint Document Stream 504 as including three user edit atoms which are all linked in reverse time order with the most recent edit represented at the tail of the list.

The PowerPoint Document Stream 504 may be characterized as the schema for all the information about a Microsoft PowerPoint™ presentation. One embodiment of a Microsoft PowerPoint™ file stores its data in records. There are two different kinds of records in the file: atoms and containers. Atoms may be defined as records that contain information about a PowerPoint object and are included within containers. Containers are records which may include atoms and other containers in accordance with a defined architecture or schema. A more detailed example of a PowerPoint Document Stream is presented in following paragraphs in connection with other figures to illustrate the techniques described herein with the VBA project area.

Figure 8:
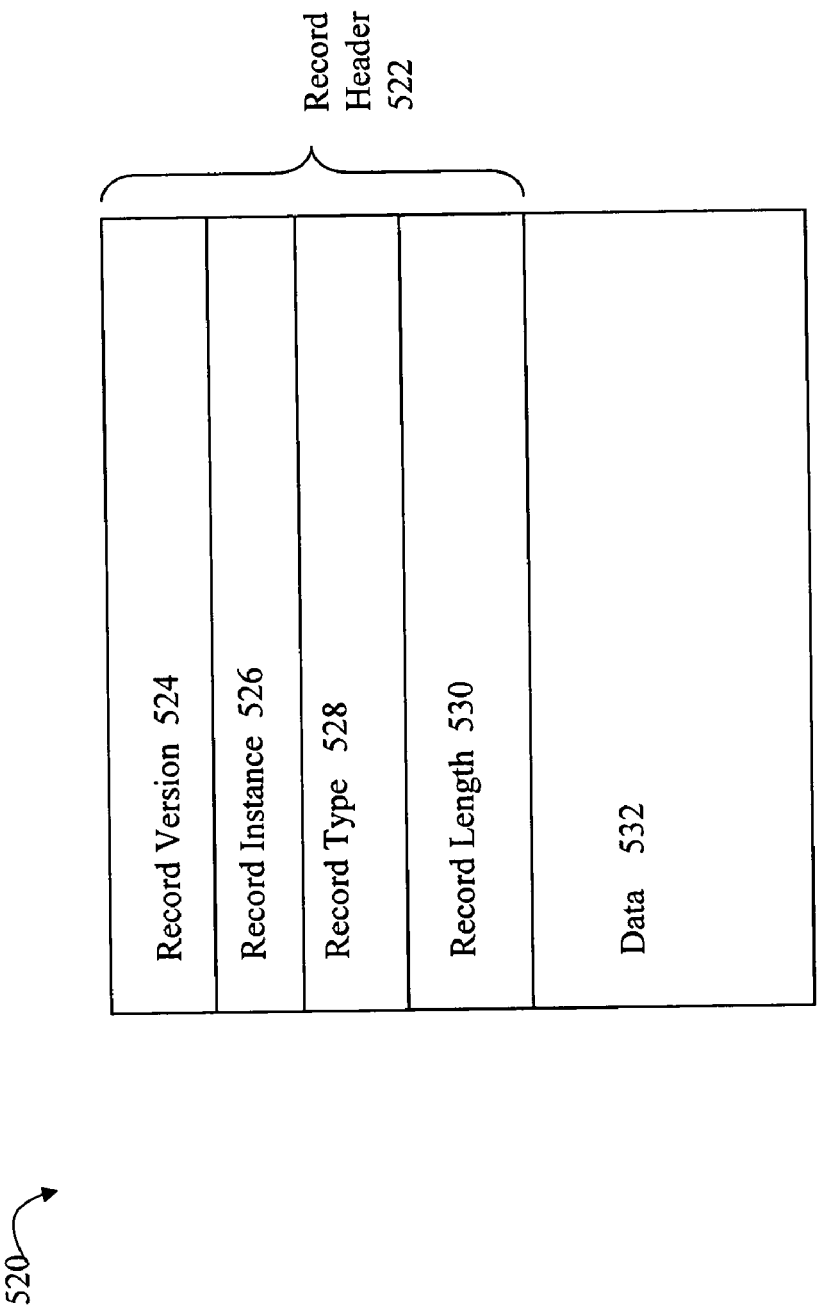

Referring now to FIG. 8, shown is an example of a physical representation of a record format as may be used in connection with records corresponding to containers and atoms for the Microsoft PowerPoint™ document representation described herein. Each record 520 includes a record header portion 522 and a data portion 532. The record header portion 522 in this example includes a record version 524, a record instance 526, a record type 528, and a record length 530. The record version 524 indicates the version of the associated record if this particular record is identified as an atom by the record type field 528. In one embodiment, if the record type field 528 indicates that the record is a container, field 528 may have a predefined default value. The record instance field 526 may be used to differentiate atoms. The instance of a record is useful for differentiating atoms when there is more than one atom of the same type in a particular container. For example, a container may include a list of fonts in which each font is represented by an atom. Each instance of an atom may vary accordingly with the font as well as the particular list being described. As described above, the record type 528, may be used to indicate a signature or type of the particular record. The record length 530 may identify the length of the record in bytes. If the record is an atom, length 530 may refer to the length of the atom excluding the header. If the record is a container, length 530 may refer to the sum of the lengths of the atoms included in the container, plus the length of the record headers. The actual data fields of the atom or container represented by a particular record 520 may be included in data portion 532.

Figure 9:
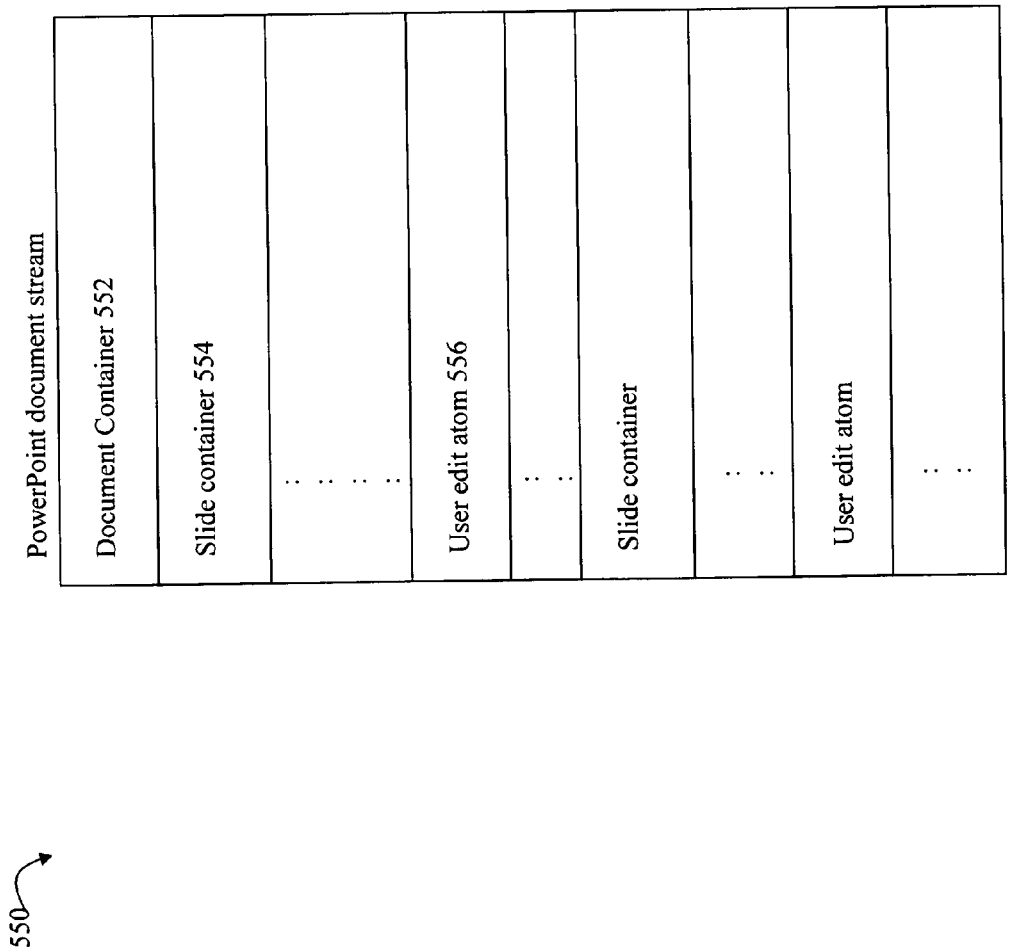

Referring now to FIG. 9, shown is an example 550 illustrating in more detail an exemplary embodiment of a PowerPoint Document Stream. The example 550 may include a document container 552, one or more slide containers 554, one or more user edit atoms 556, and other containers and/or atoms. The example 550 illustrates some of the different record types that may be included in an embodiment as well as a particular instance of a file. It should be noted that other embodiments may include other types than as described herein.

In this example, the document container 552 marks the beginning of the PowerPoint Document Stream. Each of the slide containers, such as slide container 554, may include all of the necessary atoms and containers to describe a single Microsoft PowerPoint™ slide. The user edit atom, such as atom 556, is described elsewhere herein in more detail regarding saved edits in the PowerPoint Document Stream.

Figure 10:
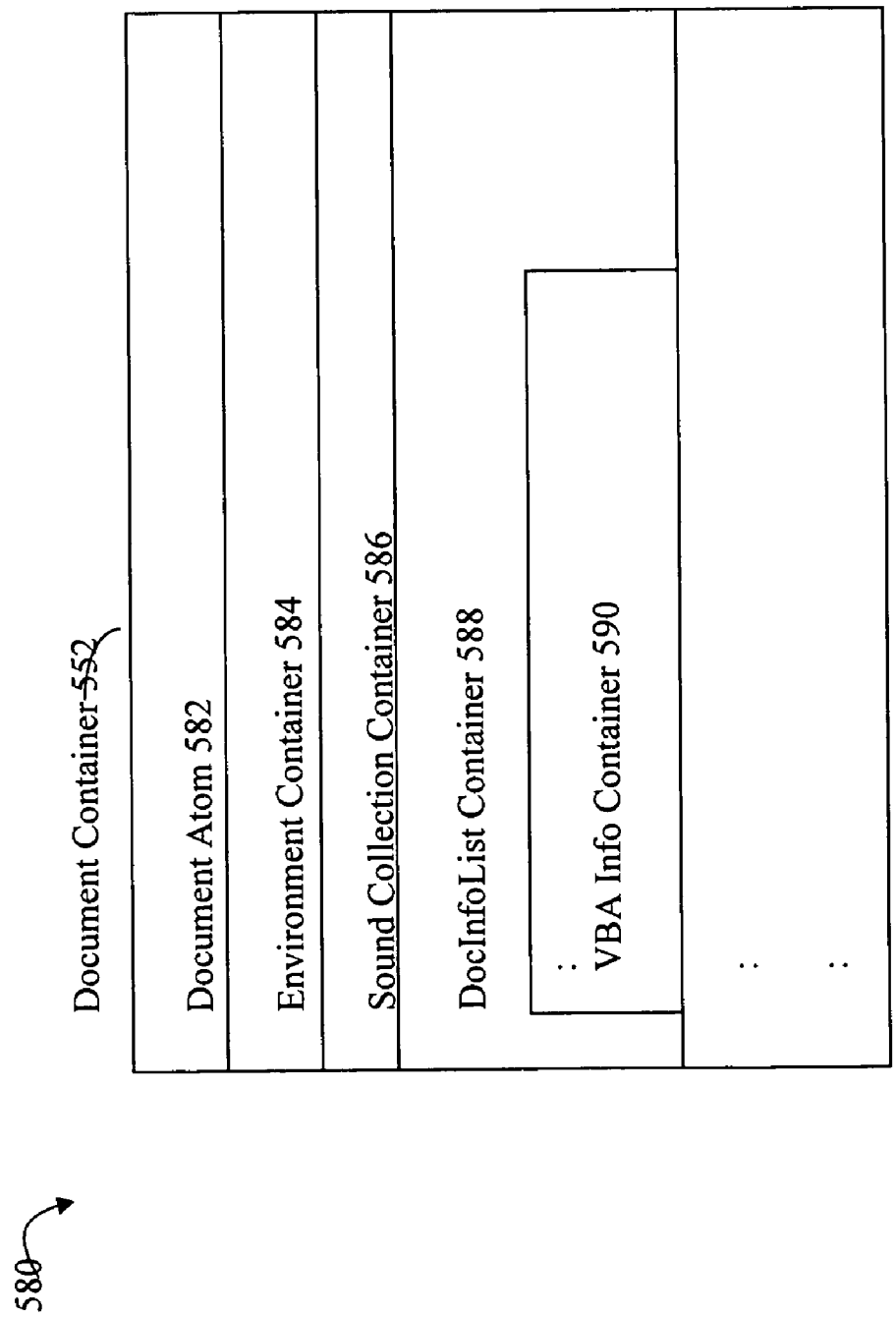

Referring now to FIG. 10, shown is an example 580 illustrating in more detail an exemplary embodiment of a document container. The example 580 provides further detail of one embodiment of the document container 552, as illustrated in FIG. 8. Other containers and/or atoms may include fields which "point to", or otherwise reference, a document container. For example, in one embodiment, each user edit atom of a PowerPoint Document Stream may include a pointer identifying the corresponding document container also included in the PowerPoint Document Stream.

In the example 580, the data container may include document atom 582, environment container 584, sound collection container 586, doc info list container 588 and VBA info container 590. As illustrated in the example 580, the doc info list container 588 may include multiple containers. One of those multiple containers in this example is the container 590. The document atom 582 may be characterized as a record that stores miscellaneous information about the Microsoft PowerPoint™ presentation. The environment container 584 may include information about the particular environment of the Microsoft PowerPoint™ presentation such as, for example, identifying the collection of particular fonts, identifying default ruler information, and the like. The sound collection container 586 may include information regarding sound elements for the particular presentation. The doc info list container 588 may be characterized as a generic container holding a variable number of containers and/or atoms. In this example, the container 588 includes the VBA info container 590. The container 590 includes information about VBA as used in connection with this presentation. In this particular example for this file format, VBA may be used, for example, in connection with macros. The container 590 may include information about the particular VBA code segments (i.e., the VBA project area) that may be optionally included with a particular presentation. In one example, the container 590 may include flag information indicating whether or not this particular presentation has defined macros. If macros are defined, container 590 may indicate that there is associated VBA code for this particular presentation. Otherwise, container 590 may indicate that there is no VBA code associated with this particular presentation.

It should be noted that the container 590 may identify the location of the associated VBA code using any one of a variety of different techniques in accordance with where the VBA code is stored. For example, an embodiment may include the VBA code within the container 590 as part of the actual Microsoft PowerPoint™ document data. An embodiment may also include the VBA code within the document associated with the Microsoft PowerPoint™ presentation at a location other than within the container 590. The embodiment may also include an identifier within the container 590 identifying an external location for the VBA code. For example, the location may be external with respect to the document container, PowerPoint Document Stream, or with respect to the docfile including all the multiple streams.

The techniques described herein may be used in connection with signing and verifying the VBA code utilized with the foregoing file format. It should be noted that the techniques described herein may be used in connection with other file formats including, for example, other binary and non-binary file formats. The techniques described herein may also be used in connection with other code portions besides VBA code portions.

The foregoing may also be used in connection with signing and/or verifying a portion of a file format which is encrypted, compressed, and/or processed using one or more other techniques resulting in conversion of the original data from a first form to a second form. In one embodiment, the portion to be signed may be included in a file which is compressed. The entire file, or selected portions thereof, may be stored in a compressed format. Similarly, the entire file, or selected portions thereof, may be stored in an encrypted form. If portions of a file are stored in a compressed, encrypted or other form, an indicator, such as a bit flag, may be used to indicate which portions are conditionally stored in this compressed or encrypted form. An embodiment may also have selected portions which are designated as always compressed, encrypted, and the like, rather than allowing a portion to be conditionally designated with an indicator.

Figure 11:
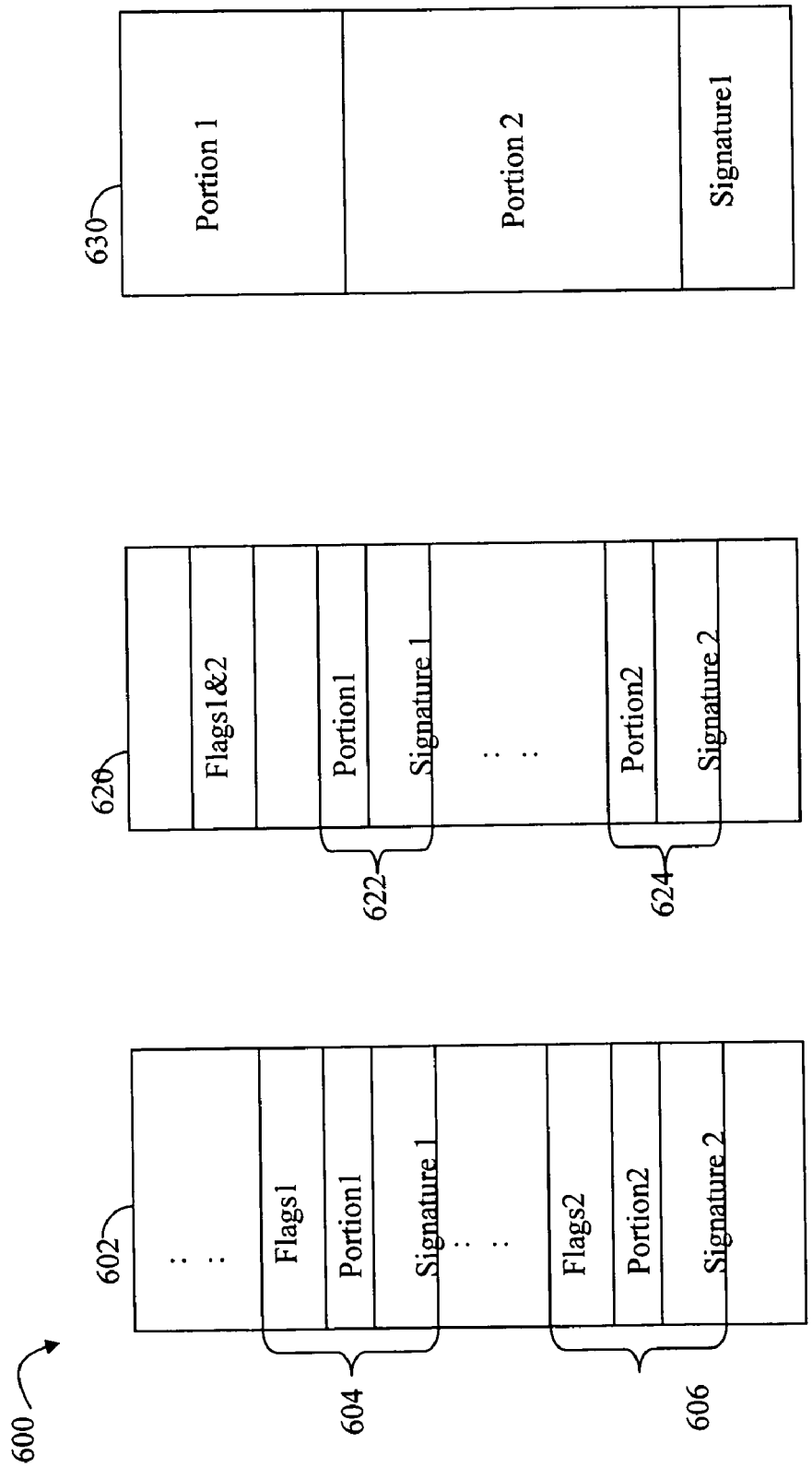
FIG. 11 illustrates examples of how embedded code may be included in other document formats in an embodiment.

Referring now to FIG. 11, shown are examples 600 of embodiments of the various file formats that may be used in connection with the techniques described herein. The first file format 602 may include portion 1 and portion 2. A digital signature may be formed for each of these portions and stored in a file in accordance with the format of 602. In this example of 602, each signature may be stored within proximity of a corresponding portion. Additionally, each of these portions has an associated flag field. The signature and flags associated with portion1 are indicated by element 604. Similarly, the signature and flags associated with portion2 are indicated by element 606. The flag field may indicate for each corresponding portion whether or not the corresponding portion has been processed in accordance with certain operations. For example, flags1 of element 604 may include a first indicator indicating whether portion1 is stored in a compressed form. Flags1 may also include a second indicator indicating whether portion1 is stored in an encrypted form. Similar indicators may be included in other flag fields associated with other portions. It should be noted that the particular flags associated with each portion may vary within a single file format.

A second file format is indicated in accordance with element 620. In the example 620, each portion has a corresponding signature as indicated by element 622 in 624. Each portion may be stored in a processed form in accordance with flags indicated by flag field. Flags1&2. In this particular example 620, a single flag field is used to indicate the form of the data stored in accordance with the file format 624 for multiple portions (e.g., portion1 and portion2) within 620.

In connection with formats in accordance with elements 602 and 620, it should be noted that portions of the file other than portion1 and portion2 may or may not be compressed, encrypted, and the like.

Another file format is indicated in accordance with element 630 in which no flag fields are illustrated. In the example 630, a designated portion of the file, such as portion 1, may have a corresponding digital signature stored in the signature1 field. Portion1 may also be stored in a compressed and/or encrypted form. Portion2 may not have a corresponding digital signature and may not have any further processing, such as for example, may not be compressed or encrypted and stored in such form.

Elements 602 and 620 are examples of file formats in which designated portions of a file may be conditionally subjected to further processing such as compression, encryption, and the like, and then stored in the file in the resultant form. Element 630 is an example of a file format in which one or more designated portions (e.g., portion1) of a file may always be subject to predetermined processing such as, for example, encryption and/or compression.

The examples in FIG. 10 are similar in that the portions having an associated digital signature are embedded within each file. One skilled in the art will appreciate that the techniques described herein may be used in connection with code portions, for example, which are stored in a location external to the document. In such embodiments, the document format may include an identifier, such as to an external file or other location, rather than the code portion itself embedded within the document.

It should also be noted that the examples illustrated herein, such as in connection with FIG. 11, include the digital signature adjacent to the corresponding portion. An embodiment may alternatively store the digital signature and corresponding portion in other arrangements in which the digital signature is separated from its corresponding portion.

The techniques described herein may be utilized in connection with any one or more different file formats. An example of other file formats that may include code portions and utilize the techniques described herein is described in pending U.S. patent application Ser. No. 11/142,061, filed May 31, 2005, "Macro-Enabled/Macro-Free Files", MS Reference No. 310270.01, which is incorporated by reference herein.

Figure 12:
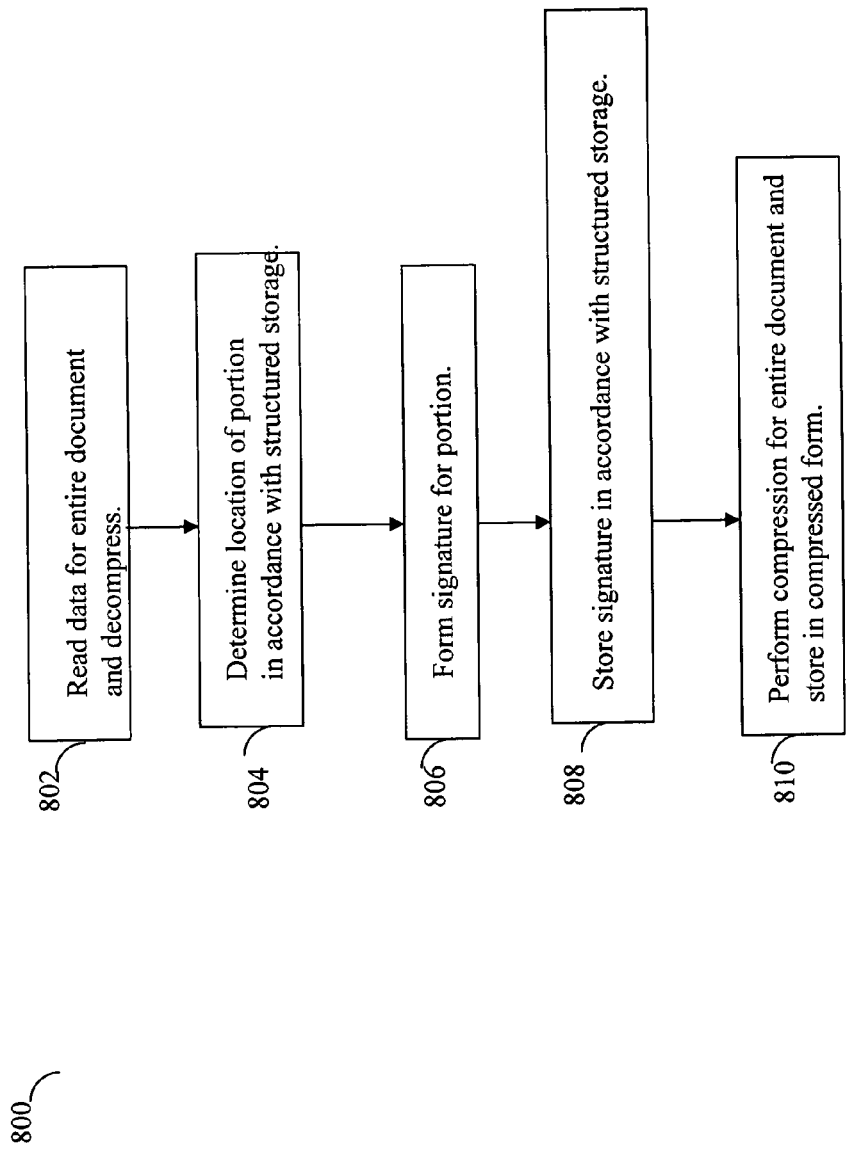
FIG. 12 is a flowchart of processing steps of one embodiment that may be performed on a compressed document using the techniques described herein.

Referring now to FIG. 12, shown is a flowchart of processing steps that may be performed an embodiment using the techniques described herein in connection with a structured storage document stored in a compressed form. In this example, the entire document may be stored in a compressed form. As will be appreciated by those skilled in the art, these processing steps may be easily adapted for use in connection with other document formats described herein. The processing steps of flowchart 800 illustrate processing steps that may be used in connection with formation of the digital signature. At step 802, data for the entire document may be read and decompressed storing the results in memory. At step 804, the location of the portion for which a digital signature is to be formed is determined in accordance with a structured storage format of the document. As described herein, the portion may be embedded within the document. At step 806, the digital signature for the portion is formed. At step 808, the digital signature is stored at a location in accordance with the structured storage for the particular file format. At step 810, compression is performed for the entire document, and the resulting data is then stored in a compressed form.

In one embodiment, a first partition of the document may be compressed and include an identifier used in connection with obtaining code from the code portion. The code portion may be included in second partition of the document which is also compressed as a separate entity from the first partition. In such an instance, the first partition is retrieved and decompressed into memory. The identifier for the code portion, such as the VBA project area, is obtained by parsing the first partition in accordance with the structured storage format of the first partition. Using the identifier, the code portion may be retrieved and decompressed into memory. The digital signature may be formed for the decompressed code portion using the techniques described herein. One skilled in the art will appreciate that the signature validate techniques described herein may also be used in connection with the digital signature formed for the decompressed code portion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for forming a digital signature for a code portion of an application document comprising:
   invoking, on a computer, a code signature module registered with an operating system of the computer, wherein:
   the application document is stored on the computer as an application document file having a structured storage format that is associated with a corresponding application program utilized to open and access the application document,
   the code portion is embedded in the application document and includes code that is executed when the application document is opened and accessed by the corresponding application program to perform processing operations on the application document, the application document includes one or more other portions storing user edits that were made to data which is to be presented when the application document is opened and accessed by the corresponding application program, the structured storage format of the application document file determines where the code portion and the other portions are stored in the application document, the registered code signature module is registered with the operating system to process the structured storage format of the application document file and is able to process a plurality of different structured storage formats that define different locations for storing code, and the registered code signature module is invoked by an operating system routine on the computer for signing the code portion of the application document without utilizing the corresponding application program to open and access the application document;

parsing the application document stored on the computer in accordance with the structured storage format of the application document file to locate the code portion of the application document;

obtaining, by the registered code signature module, the code portion of the application document;

providing a hash for the code portion of the application document to the operating system; and automatically signing the code portion of the application document by storing a digital signature constructed by the operating system in the application document, wherein:

the digital signature is stored in the application document in accordance with the structured storage format of the application document file without utilizing the corresponding application program to open and access the application document, the digital signature corresponds to the code portion and is for verification that the code included in the code portion of the application document has not been modified after the digital signature was stored, and the digital signature does not correspond to the other portions of the application document and is not for verification of the data included in the other portions of the application document which is to be presented when the application document is opened and accessed by the corresponding application program.

2. The method of claim 1, wherein:
the operating system uses the hash and a digital certificate to construct the digital signature for the code included in the code portion of the application document.

3. The method of claim 1, wherein the code portion of the application document is associated with one or more macros for the application document.

4. The method of claim 1, wherein the code portion of the application document includes source code used in connection with the corresponding application program.

5. The method of claim 1, wherein the code portion of the application document includes one or more scripts comprising instructions in human-readable form.

6. The method of claim 1, further comprising:
the operating system routine calling the registered code signature module to determine a hash value for the code portion of the application document.

7. The method of claim 1, further comprising:
invoking a first application-specific library for parsing the application document in accordance with a first structured storage format associated with a first corresponding application.

8. The method of claim 7, further comprising:
invoking a second application-specific library for parsing another application document in accordance with another structured storage format associated with a second corresponding application different than the first corresponding application.

9. The method of claim 1, further comprising:
verifying the digital signature corresponding to the code portion to ensure that the code included in the code portion has not been modified.

10. The method of claim 9, further comprising:
determining a first hash value from the digital signature corresponding to the code portion of the application document;
calculating a second hash value for the code portion of the application document; and
comparing the first hash value to the second hash value.

11. The method of claim 10, further comprising:
verifying the digital signature corresponding to the code portion of the application document only if the first hash value and the second hash value match.

12. The method of claim 1, wherein the application document is stored in a compressed form, the method further comprising:
decompressing at least the code portion of the application document prior to forming the digital signature; and
forming the digital signature for the code included in the code portion of the application document using the code portion of the application document in a decompressed form.

13. The method of claim 1, further comprising:
forming a second digital signature for a second portion of the application document; and
storing the second digital signature in the application document in accordance with the structured storage format of the application document file, wherein the second digital signature is for verification of the second portion of the document but not the code portion of the application document.

14. A computer-readable storage medium that does not consist of a signal, the computer-readable storage medium having computer executable instructions stored thereon that, when executed by a computer, cause the computer to perform a method for forming a digital signature for a code portion of an application document, the method comprising:
invoking a code signature module registered with an operating system of the computer, wherein:
the application document is stored on the computer as an application document file having a structured storage format that is associated with a corresponding application program utilized to open and access the application document,
the code portion is embedded in the application document and includes code that is executed when the application document is opened and accessed by the corresponding application program to perform processing operations on the application document,
the application document includes one or more other portions storing user edits that were made to data which is to be presented when the application document is opened and accessed by the corresponding application program, the structured storage format of the application document file determines where the code portion and the other portions are stored in the application document, the registered code signature module is registered with the operating system to process the structured storage format of the application document file and is able to process a plurality of different structured storage formats that define different locations for storing code, and the registered code signature module is invoked by an operating system routine on the computer for signing the code portion of the application document without utilizing the corresponding application program to open and access the application document;

calling, by the registered code signature module, a first application-specific library, wherein the first application-specific library is for the structured storage format of the application document file and is one of a plurality of application-specific libraries, each of the plurality of application-specific libraries corresponding to a different structured storage format;

parsing the application document stored on the computer to locate the code portion of the application document using the first application-specific library for the structured storage format of the application document file;

obtaining, by the registered code signature module, the code portion of the application document;

providing a hash for the code portion of the application document to the operating system; and automatically signing the code portion of the application document by storing a digital signature constructed by the operating system in the application document, wherein:

the digital signature is stored in the application document in accordance with the structured storage format of the application document file without utilizing the corresponding application program to open and access the application document, the digital signature corresponds to the code portion and is for verification that the code included in the code portion of the application document has not been modified after the digital signature was stored, and the digital signature does not correspond to the other portions of the application document and is not for verification of the data included in the other portions of the application document which is to be presented when the application document is opened and accessed by the corresponding application program.

15. The computer-readable storage medium of claim 14, wherein the registered code signature module is called by a routine in the operating system to verify the digital signature corresponding to the code portion to ensure that the code included in the code portion has not been modified.

16. The computer-readable storage medium of claim 14, wherein:

the operating system constructs the digital signature for the code included in the code portion of the application document using the hash and a digital certificate.

17. The computer-readable storage medium of claim 15, further comprising computer executable instructions for performing steps comprising:

the operating system generating a first hash value from the digital signature corresponding to the code portion of the application document;

the operating system calling the registered code signature module to form a second hash value for the code portion of the application document and to compare the first hash value and the second hash value.

18. The computer-readable storage medium of claim 15, further comprising computer executable instructions for performing steps comprising:

the operating system invoking the registered code signature module to form a second digital signature for a second portion of the application document; and the registered code signature module calling one or more routines in the first application-specific library to store the second digital signature, wherein the second digital signature is for verification of the second portion of the application document but not the code portion of the application document.

19. A method for forming a digital signature for an embedded code portion of an application document comprising:

invoking, on a computer, a code signature module registered with an operating system of the computer for signing the embedded code portion of the application document, wherein:

the application document is stored on the computer as an application document file having a structured storage format that is associated with a corresponding application program utilized to open and access the application document, the embedded code portion includes code that is executed when the application document is opened and accessed by the corresponding application program to perform processing operations on the application document, the application document includes one or more other portions storing user edits made to the application document, the structured storage format of the application document file determines where the code portion and the other portions are stored in the application document, the registered code signature module is registered with the operating system to process the structure storage format of the application document file and is able to process a plurality of different structured formats that define different locations for storing code, and the registered code signature module is invoked by an operating system routine on the computer for signing the embedded code portion of the application document without utilizing the corresponding application program to open and access the application document;

parsing the application document stored on the computer in accordance with the structured storage format of the application document file to locate the embedded code portion of the application document;

obtaining, by the registered module, the embedded code portion of the application document in a compressed form;

decompressing the embedded code portion of the application document into a decompressed code portion of the application document;

providing a hash for the decompressed code portion of the application document to the operating system; and automatically signing the code portion of the application document by storing a digital signature constructed by the operating system in the application document, wherein:

the digital signature is stored in the application document in accordance with the structured storage format of the application document file without utilizing the corresponding application program to open and access the application document, the digital signature corresponds to the embedded code portion and is for verification that the code included in the embedded code portion of the application document has not been modified after the digital signature was stored, and the digital signature does not correspond to the other portions of the application document and is not for verification of the data included in the other portions of the application document which is to be presented when the application document is opened and accessed by the corresponding application program.

20. The method of claim 19, further comprising:

decompressing a second portion of the application document;

forming a second digital signature for the second portion of the application document; and storing the second digital signature in the application document in accordance with the structured storage format of the application document file, wherein the second digital signature is for verification of the second portion of the application document but not the embedded code portion of the application document.

\* \* \* \* \*